United States Patent
Brudy et al.

(10) Patent No.: US 10,431,117 B2
(45) Date of Patent: Oct. 1, 2019

(54) PROJECTION OF HAZARDOUS ITEMS INTO X-RAY IMAGES OF INSPECTION OBJECTS

(71) Applicant: Smiths Heimann GmbH, Wiesbaden (DE)

(72) Inventors: Thomas Brudy, Eltville (DE); Susanne Kruppa, Frankfurt am Main (DE)

(73) Assignee: SMITHS HEIMANN GMBH, Wiesbaden (DE)

( * ) Notice: Subject to any disclaimer, the term of this patent is extended or adjusted under 35 U.S.C. 154(b) by 229 days.

(21) Appl. No.: 15/322,689

(22) PCT Filed: Jul. 1, 2015

(86) PCT No.: PCT/EP2015/064940
§ 371 (c)(1),
(2) Date: Dec. 28, 2016

(87) PCT Pub. No.: WO2016/001282
PCT Pub. Date: Jan. 7, 2016

(65) Prior Publication Data
US 2017/0140667 A1    May 18, 2017

(30) Foreign Application Priority Data
Jul. 1, 2014    (DE) .......... 10 2014 109 214

(51) Int. Cl.
*G09B 19/24* (2006.01)
*G01V 5/00* (2006.01)
*G09B 5/02* (2006.01)

(52) U.S. Cl.
CPC .......... *G09B 19/24* (2013.01); *G01V 5/0016* (2013.01); *G09B 5/02* (2013.01)

(58) Field of Classification Search
CPC ...... G01V 5/0008; G09B 5/02; G01N 23/083; G06K 2209/09
See application file for complete search history.

(56) References Cited

U.S. PATENT DOCUMENTS 5,243,693 A * 9/1993 Maron ................. G06T 15/005
345/634
6,899,540 B1    5/2005 Neiderman et al.
(Continued)

FOREIGN PATENT DOCUMENTS

CA    2651131 A1    11/2007

OTHER PUBLICATIONS

Cutler, Victoria et al., "Use of Threat Image Projection (TIP) to enhance security performance", 43rd Annual 2009 International Carnahan Conference, Oct. 5-8, 2009.
(Continued)

*Primary Examiner* — Vincent Rudolph
*Assistant Examiner* — Raphael Schwartz
(74) *Attorney, Agent, or Firm* — Kevin E. West; Advent, LLP

(57) ABSTRACT

The present disclosure relates to a device and method for generating test X-ray images for nondestructively inspecting an inspection object, such as a piece of luggage or a package. The generation device includes: an inspection object database for storing X-ray image data of inspection objects generated using at least one X-ray inspection facility; a target item database containing image data of target items; and an image projection unit for projecting a virtual image of a target item from the target item database into an X-ray image from the inspection object database to generate a test X-ray image. The image projection unit is configured for generating test images based on an X-ray image of an inspection object, the X-ray image having been recorded
(Continued)

prior to a first time period, and the associated inspection object having already been classified as safe and/or having been classified as safe during an automatic inspection.

20 Claims, 3 Drawing Sheets

(56) References Cited

U.S. PATENT DOCUMENTS

| | | |
|---|---|---|
| 2008/0044801 A1 | 2/2008 | Modica et al. |
| 2008/0170660 A1* | 7/2008 | Gudmundson ...... G06K 9/6255 378/57 |
| 2012/0229631 A1* | 9/2012 | Song ....................... H04N 7/18 348/143 |

OTHER PUBLICATIONS

International Search Report dated Oct. 5, 2015 for PCT/EP2015/064940.
International Preliminary Report on Patentability dated Jan. 12, 2017 for PCT/EP2015/064940.

\* cited by examiner

PROJECTION OF HAZARDOUS ITEMS INTO X-RAY IMAGES OF INSPECTION OBJECTS

The present present disclosure relates in general to X-ray images of inspection objects as provided, for example, by X-ray inspection facilities at security screening points in airports. In particular, the present disclosure relates to the provision of test X-ray images which for training and/or performance testing purposes contain a hazardous item to be detected.

BACKGROUND

Some computer systems for training and testing operators of X-ray inspection facilities for baggage screening are configured to display to an operator, on a baggage screening monitor, computer-generated contraband items or hazardous objects in an X-ray image of an actual piece of luggage. The hazardous objects have been previously recorded, and in each case are embedded in the image of the actual piece of luggage during operation.

The display of a test X-ray image in which a hazardous object is contained is referred to as image projection of hazardous items (threat image projection (TIP)). Originally, TIP concerned only hazardous objects, i.e., prohibited substances or hazardous items; in principle, however, TIP may also be extended to contraband items and other objects. When an X-ray image of a fictitious contraband item or a fictitious hazardous object is superimposed on the X-ray image of an actual piece of luggage in such a way that the fictitious object appears to be present in the actual piece of luggage, such a test image is correspondingly referred to as a fictitious threat image (FTI). Alternatively, an X-ray image of an actual piece of luggage in which an actual hazardous object has been introduced beforehand may be displayed; a test image generated in this way is referred to as a combined threat image (CTI). For further information concerning TIP, reference is made, for example, to Cutler, V. and Paddock, S., 2009, "Use of threat image projection (TIP) to enhance security performance," 43rd International Carnahan Conference on Security Technology, Oct. 5-8, 2009, pages 46-51, DOI: 10.1109/CCST.2009.5335565.

For example, (EU) Directive Nos. 300/2008 and 185/2010 prescribe at least six hours of instruction and/or computer-assisted training every six months for operators of X-ray inspection facilities in aviation security. In addition, initial performance testing and recurring performance testing for such operators at least every three years is obligatory. (EU) Commission Directive No. 185/2010 of Mar. 4, 2010, which establishes detailed measures for implementing the common basic standards in aviation security, specifies mandatory requirements for, among other things, image projection of hazardous items (threat image projection (TIP)). By use of the above described computer system, on the one hand the knowledge and abilities of operators when target items are detected in X-ray images may be evaluated, and on the other hand operators may thus receive training, continuing training, and testing.

FTI test X-ray images may be a drawback in real-time use at security screening points. When a target item is projected into an actual piece of luggage, this piece of luggage must be checked, either beforehand or afterwards, without TIP in order to prevent a target item, possibly actually present in the piece of luggage, from being overlooked. This results in delays during operations. CTI test X-ray images are X-ray images which are not part of any piece of luggage to be checked at that moment during operations. Thus, although no additional checking of the associated inspection object is necessary, a large number of CTI test images must be kept in the system, which in addition must be routinely replaced or updated so that the operators do not consciously or unconsciously remember the test images. This results in ongoing administrative effort and corresponding costs.

There are also simulation systems for simulating an X-ray inspection facility. The system essentially comprises a computer and a database with component images which contain nonhazardous background images and hazardous foreground images. The system may combine various foreground and background images into a composite image to simulate the concealment of hazardous items and the like in a piece of passenger luggage. A composite image simulated in this way may be represented on a display for an operator being trained, who then uses a selection means to attempt to identify a foreground image, which may be a hazardous item, contained in the associated component image. The system may implement standard X-ray scanner functions, such as simultaneously displaying multiple images on the display, and stopping and starting a conveyor belt on which the passenger luggage is conveyed in order to allow accurate inspection of a certain piece of luggage, and so forth.

SUMMARY

Embodiments of the present disclosure relate to a device and a method for generating test X-ray images for training and/or testing operators, by means of which the disadvantages discussed in conjunction with the known systems based on FTIs and CTIs may be avoided or at least reduced.

Features and details described in conjunction with the method according to the present disclosure naturally also apply in conjunction with the device according to the present disclosure, and vice versa. Therefore, mutual reference is made with respect to the disclosure of the individual aspects.

A core concept of the present disclosure lies in generating test X-ray images in the manner of an FTI, but based on inspection objects checked on site, the test X-ray images being displayed to an operator in the way that CTIs are used. Since no X-ray images are manipulated during current operation to form inspection objects to be checked, no additional inspection effort results, and the associated delays are avoided. Due to the fact that the test X-ray images are based on X-ray images of inspection objects actually checked at the particular inspection site (location of use of the X-ray inspection facility), the test X-ray images displayed to an operator do not differ from those of inspection objects checked during current operation. Luggage which is typical for the particular inspection site, such as an airport, is quasi-automatically imaged. Known CTI images may be unrealistic, and may thus be immediately recognizable as such by an operator. For example, for conventional CTIs, which are centrally generated by the manufacturer of the inspection facility, for example, the inspection objects in the test X-ray images may not correlate with the typical inspection objects on site. This may be caused by differences due to the time of year (summer luggage/winter luggage) or due to the travel destinations (luggage for international/national travel destinations/air freight luggage) or due to transport means typically used on site for the luggage (luggage in transport containers/loose pieces of luggage), etc.

A first aspect of the present disclosure relates to a device for generating test X-ray images for training and/or testing operators at the location of use of at least one X-ray inspection facility for nondestructively inspecting an inspection object, in particular a piece of luggage or a package.

These may be X-ray inspection facilities by means of which an operator may detect items or substances to be identified in an inspection object. For example, these may be X-ray inspection facilities as used at security screening points in the baggage transfer system, for example at airports, in order to automatically inspect pieces of luggage and freight goods nondestructively, i.e., without opening them, which are to be stowed onboard an aircraft. Such X ray inspection facilities may also be used at other inspection sites, for example at entrances to security-relevant areas or buildings, at border inspection posts, etc., for inspecting objects such as hand luggage or postal items such as letters, packets, and packages carried by persons. The objective of such inspections is to detect certain target items.

Target items may be, firstly, potentially hazardous objects or substances such as weapons, explosives, chemicals, etc., i.e., hazardous items. However, other items or materials/substances which initially do not pose a direct threat may also be target items. Target items may also be, for example, data media such as DVDs or CD-ROMs, contraband items, money, drugs, etc. Foods may also be target items. That is, a target item in principle is understood here to mean an object to be identified or a substance to be identified which is to be detected by an operator of the facility. Similarly, image data of such items are contained in the target item database.

The generation unit device device can comprise: (i) an inspection object database for storing X-ray image data of inspection objects generated using the at least one X-ray inspection facility; (ii) a target item database containing image data of target items; and (iii) an image projection unit for projecting a virtual image of a target item from the target item database into an X-ray image from the inspection object database in order to generate a test X-ray image. The image projection unit is configured for generating test X-ray images based on an X-ray image of an inspection object, the X-ray image having been recorded prior to a first time period, and the associated inspection object having already been classified as safe and/or having been classified as safe during an automatic inspection.

The first time period may be set corresponding to a time required for the inspection object, on which the X-ray image for the test X-ray image is based, to reach its destination, for example a destination airport. Thus, the first time period may preferably be one to several days, particularly preferably one to two weeks.

In the present context, "automatically inspected" means that the inspection object on which the X-ray image for the test X-ray image is based has not yet been visually checked by an operator at the time of the inspection, but, rather, has been analyzed by automatically running test routines implemented in the X-ray inspection facility and found to be safe/unobjectionable with regard to target items. In the present context, "classified/found as safe" means that it has been determined that the inspection object with sufficient certainty contains no target item. It may thus be ruled out that an inspection object on which the test X-ray image is based is displayed, for training or testing, to an operator who has already actually seen the inspection object during real-time operation. This ensures that the inspection objects on which the test X-ray images are based, and thus also test X-ray images based thereon, in each case are unknown to an operator.

With regard to the TIP processing, reference is made, for example, to Schwaninger, A., Michel, S., and Bolfing, A. (2007), "A statistical approach for image difficulty estimation in X-ray screening using image measurements," Proceedings of the 4th Symposium on Applied Perception in Graphics and Visualization, ACM Press, New York, US, 123-130.

The generation device may also include an update unit for the inspection object database. The update unit may be configured for updating the inspection object database by deleting from the inspection object database an X-ray image which is older than a second time period and/or which has been used for a certain number of times, in particular once, for generating a test X-ray image, or blocking further use of same.

The generation device may also include a test X-ray image database, whereby the image projection unit may be configured for storing generated test X-ray images in the test X-ray image database. An inventory containing any desired number of test X-ray images may thus be generated for training purposes, regardless of the need at that moment for displaying a test X-ray image during operation of the at least one X-ray inspection facility.

The update unit and/or the image projection unit, in the form of a single unit or two separate units, may also be configured for updating test X-ray images in the test X-ray image database by deleting a test X-ray image which is older than a third time period and/or which has been used for a certain number of times, in particular once, for training or testing an operator, or blocking further use of same.

A further aspect of the present disclosure relates to a central control unit for at least one X-ray inspection facility for inspection objects, in particular pieces of luggage or other packages, together with one of the above-described embodiments of a generation device. For this purpose, the control unit is connected, such as via a communications network, to the at least one X-ray inspection facility for data exchange. The control unit can be connected to a display unit for displaying X-ray images of a current inspection object during operation for checking inspection objects (inspection mode), or for displaying a test X-ray image for training or testing an operator (training or performance testing mode).

It is noted that the control unit may also be configured for displaying so-called false alarm images as test X-ray images. False alarm images are test X-ray images in which no target item is embedded. Since the inspection object database in principle contains X-ray images which have been checked or verified as safe, these X-ray images may readily be used as false alarm images.

The central control unit may be a network display station, for example, which is connected to multiple interconnected X-ray inspection facilities which can automatically check inspection objects in each case. It is possible that during the automatic inspection, an inspection object may not be classifiable as unobjectionable with the required level of certainty by the analysis routines implemented in the X-ray inspection facility. Prior to a manual check of the inspection object, a trained operator conducts a visual inspection of the X-ray image(s) of this inspection object. For this purpose, the particular X-ray image may be transmitted to the central control unit and displayed there on the display unit to an operator. X-ray images of current inspection objects may thus be displayed on the display unit during normal operation (inspection mode). However, it is also possible, pursuant to the regulatory requirements discussed at the outset, to display test X ray images to the operator for training and/or performance testing (training or performance testing mode). In the design proposed here, it may be ensured that the operator receives no indication as to whether the display of a test X-ray image is imminent or has just occurred. That is, at any point in time, an operator does not know whether an X-ray image displayed on the display unit is an X-ray image of an inspection object actually to be checked at that moment during operation, or a test X-ray image.

A further aspect of the present disclosure relates to a baggage or package inspection system which includes at least one X-ray inspection facility and at least one above-described central control unit. The control unit can be arranged with respect to the at least one X-ray inspection facility in such a way that an inspection object to be checked at that moment, using the at least one X ray inspection facility, is not visible to an operator. That is, the at least one X-ray inspection facility is at a distance or spatially separated from the workstation of an operator, so that the operator is not able to see an inspection object to be checked at that moment during operation.

The described arrangement between the central control unit and the X-ray inspection facility/facilities is easily provided for so-called level 2 inspection sites. These are, for example, inspection devices which at airports check pieces of luggage or packages which are left by passengers or third parties for transport via an aircraft. In contrast, so-called carry-on luggage which passengers carry onboard a flight is checked at a level 1 inspection site. With level 1 inspection devices, it is usually the case that an operator of the X-ray inspection facility is able to see a piece of luggage to be checked at that moment, before it enters the X-ray inspection facility. Therefore, the test X-ray images generated using the system proposed here may be used at such level 1 inspection devices only for training purposes, but not for random testing during operation.

A further aspect of the present disclosure relates to a method for generating test X-ray images for training and/or testing operators at the location of use of at least one X-ray inspection facility for nondestructively inspecting an inspection object, in particular a piece of luggage or a package.

The method can comprise: (a) providing X-ray images which have been generated using the at least one X-ray inspection facility; and (b) providing image data of target items; (c) generating a test X-ray image by projecting image data of a target item into one of the provided X-ray images; and (d) displaying a test X-ray image for training and/or testing an operator, it being ensured that the test X-ray image is based on an X-ray image of an inspection object, the X-ray image having been recorded prior to a first time period, and the associated inspection object having already been classified as safe and/or having been classified as safe during an automatic inspection. It can be further ensured that a test X-ray image is displayed which is based on an X-ray image of an inspection object which is not older than a second time period and/or which has already been used for a certain number of times, in particular once, for generating a test X ray image.

In one embodiment, new test X-ray images based on the provided X-ray images and the provided image data of target items are continuously generated and stored. Stored test X-ray images which are older than a third time period and/or which have already been used for a certain number of times, in particular once, are preferably deleted or blocked for further use.

It is noted that for the generation device and/or the generation method, the mentioned second and third time periods may have the same duration.

The image projection unit or the image projection method can be used in X-ray inspection facilities of inspection objects for training, continued training, and/or testing of the operator of such facilities.

BRIEF DESCRIPTION OF THE DRAWINGS

Further advantages, features, and particulars of the present disclosure result from the following description, in which exemplary embodiments of the present disclosure are described in detail with reference to the drawings. The features mentioned in the claims and in the description may in each case be essential to the present disclosure, alone or in any combination. Likewise, the features described above and to be further explained below may each be used individually or collectively in any combination. Functionally equivalent or identical parts or components are sometimes provided with the same reference numerals. The terms "left," "right," "top," and "bottom" used in the description of the exemplary embodiments refer to the drawings in an orientation in which the figure numbers or reference numerals are normally readable. The embodiments shown and described are not to be construed as an exhaustive listing, but, rather, are exemplary in nature for describing the present disclosure. The detailed description is used for the information of those skilled in the art; therefore, known circuits, structures, and methods are not described or explained in detail in the description in order to not complicate understanding of the present description.

DETAILED DESCRIPTION

Figure 1:
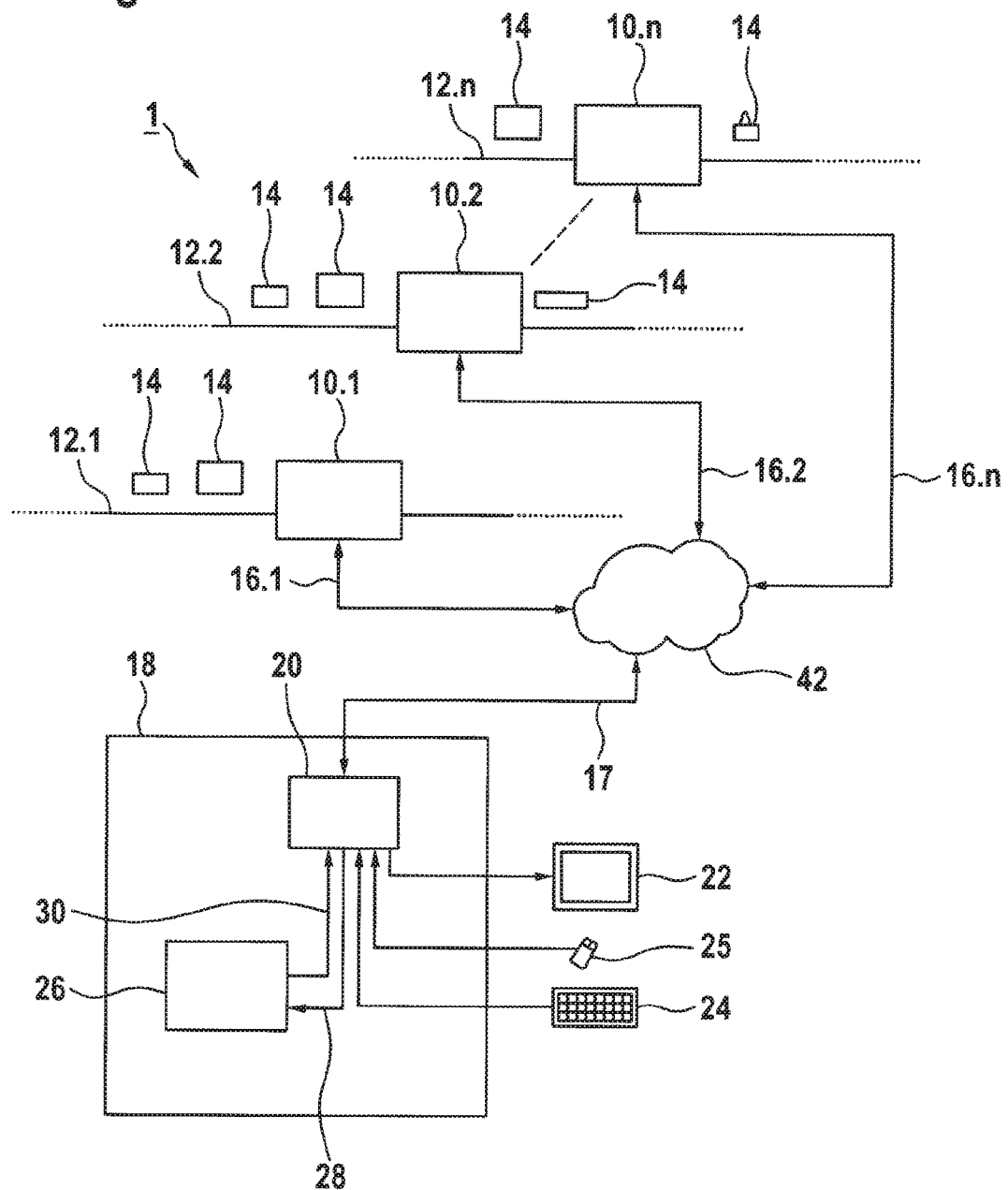
FIG. 1 shows a baggage or package inspection system in a schematic illustration as a block diagram.

FIG. 1 shows an automatic baggage or package inspection system 1 (inspection system 1 for short), as used, for example, at airports for level 2 luggage or packages. This involves the checking of inspection objects that are provided by third parties or passengers for loading into the cargo area of an aircraft. It is noted that the measures discussed here with respect to the image projection of hazardous items (TIP) may be used in principle in conjunction with all embodiments of X-ray inspection facilities, at least for training purposes.

The inspection system 1 contains a number n of X-ray inspection facilities 10.1, 10.2, and 10.n, known per se, which are schematically indicated in each case by a rectangle. Pieces of luggage or packages as inspection objects 14 for automatic inspection in each case by one of the X-ray inspection facilities are transported on conveyor belts 12.1, 12.2, and 12.n associated with the respective X-ray inspection facility 10.1, 10.2, and 10.n. The X-ray inspection facilities 10.1, 10.2, 10.n operate according to known principles, and therefore are not explained here in greater detail.

All X-ray inspection facilities 10.1, 10.2, 10.n of the inspection system 1 are interconnected by means of a data network 42 to at least one central control unit 18, spatially separate from the individual X-ray inspection facilities 10.1, 10.2, and 10.n, via data connections 16.1, 16.2, and 16.n, respectively. The central control unit 18 itself is connected to the data network 42 via a corresponding data connection 17.

The central control unit 18 is the workstation of an operator. To this end, a display unit 22 is provided for visually inspecting X-ray images of an inspection object. For example, when one of the X-ray inspection facilities 10.1, 10.2, 10.n is not able to automatically decide on the safety of an inspection object 14, the X-ray image or the X-ray images of the inspection object in question is/are displayed to the operator on the display unit 22. That is, when the inspection routines implemented in the X-ray inspection facilities 10.1, 10.2, 10.n, based on one or more X-ray images of a current inspection object 14, are not able to determine with the necessary level of certainty that a target item, such as a hazardous substance, is not present in the inspection object 14, the responsible operator must conduct a visual inspection, using the display unit 22. The operator then decides, for example, whether the inspection object in question must be opened and subjected to a manual inspection.

The control unit 18 has input means 24, such as a keyboard and/or individual input keys, and control elements, for example a joystick, a mouse, a trackball, or the like. The operator is thus able to make control inputs, etc., in a customary, known manner. The hardware and software for a data processing system 20 which is customary and thus known, and which is necessary for the functions described here is also situated in the central control unit 18. That is, all functions described below may be implemented essentially by means of a data processing system 20, known per se, in one programmable computing unit or distributed over multiple programmable computing units. The data processing system 20 is then configured, i.e., programmed, essentially for carrying out the described functions and methods or portions thereof.

The data processing system 20 typically has one or more processors as the central computing unit, and an internal memory and/or an external memory which for the software is nonvolatile, and which is configured for operational data in the manner of a random access memory (RAM) (none of which are shown). For interaction with functional components of the device, the data processing system 20 is connected to the individual X-ray inspection facilities 10.1, 10.2, 10.n via communication interfaces with the data network 42, for example. As the input/output interface for interaction with the operator, one or more screens 22 is/are used as the display unit, and a keyboard 24 and/or mouse 25 are/is used as the input unit.

Furthermore, it is noted that the functions and methods described here may be implemented completely by means of a computer program, or completely in hardware, or also in any mixed form between hardware and software for the implementation. For image processing operations, for example in the image projection of a hazardous item (TIP) into an X-ray image of an inspection object, all or individual method steps may also be converted into corresponding program instructions by hardware that is specialized for image processing, such as graphics processing units (GPUs).

For generating test X-ray images for training or testing an operator, a generation device 26 for test X-ray images is provided which is configured for generating test X-ray images in the manner of an FTI, but based on inspection objects recently checked on site, and then displaying same to an operator for the mentioned training purposes and/or testing purposes, similarly as for CTIs. The test X-ray images generated using the TIP method proposed here are correspondingly referred to here as pseudo-FTIs.

Figure 2:
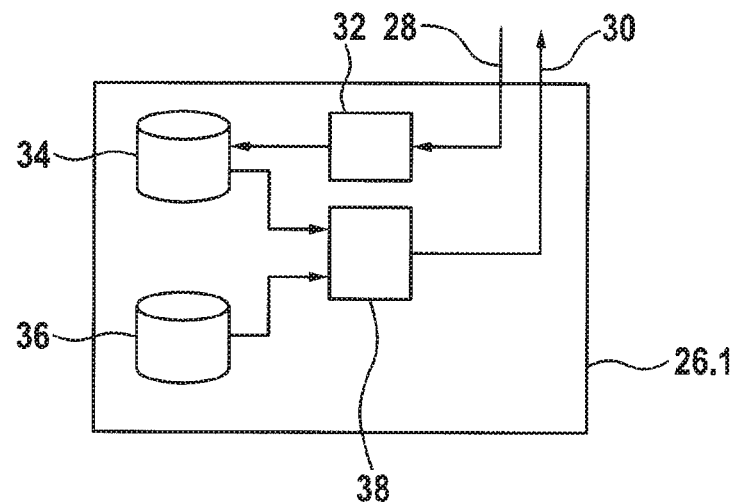
FIG. 2 shows a first embodiment of a device for generating test X-ray images.

FIG. 2 shows a first embodiment of a generation device 26.1, with an update unit 32 that is connected to the data processing system 20 of the control unit 18 via a data line 28. Current [X ray images generated] during operation of the X ray inspection facilities 10.1, 10.2, 10.n of the inspection system 1 are transmitted to the update unit 32 via the data line 28.

In the first embodiment shown in FIG. 2, the update unit 32 is configured for storing the received X-ray images of the inspection objects, which have been checked on site in the inspection system 1, in an inspection object database 34. In addition, the update unit 32 is configured for updating the inspection object database 34 in such a way that (1) an X-ray image stored there is not older than a predetermined second time period, and/or (2) an X-ray image stored there is deleted or blocked for further used as soon as it has been used for a predetermined number of times, in particular once, for generating a test X-ray image. In addition, a target item database 36 in which a library containing image data of target items is stored is provided in the test X-ray image generation device 26.1. In other words, image data of such items which are to be detected in the inspection objects by the inspection system 1 are stored in the target item database 36.

Target items are potentially hazardous objects and materials such as weapons, explosives, chemicals, etc., i.e., hazardous items. Other items which initially do not pose a direct threat may also be of interest. That is, target items may also be data media such as DVDs or CD-ROMs, contraband items, money, drugs, etc. Lastly, the detection of foods may also be desirable, in which case the target item database also contains image data of relevant foods.

An image projection unit 38 is configured for projecting a virtual image of an item, such as a hazardous object, from the target item database 36 into an X-ray image from the inspection object database 34 in order to generate a test X-ray image. A test X-ray image generated in this way is provided by the test X-ray image generation device 26.1 to the data processing system 20 of the control unit 18 via a data line 30.

The data processing system 20 is configured for randomly displaying, during operation, a test X-ray image to an operator corresponding to the applicable regulatory requirements, for example without information or notification, to be able to check the level of training, the detection capabilities, and optionally the attentiveness of an operator. With regard to the capabilities of the system required in conjunction with the image projection of hazardous items and/or prohibited substances, in order to avoid repetition, reference is made to (EU) Directive No. 185/2010 of Mar. 4, 2010, which establishes detailed measures for implementing the common basic standards in aviation security, in particular items 11.4 and 12.5 therein. For the sake of completeness, it is noted that TIP is also a requirement in corresponding directives outside the European Community.

Figure 3:
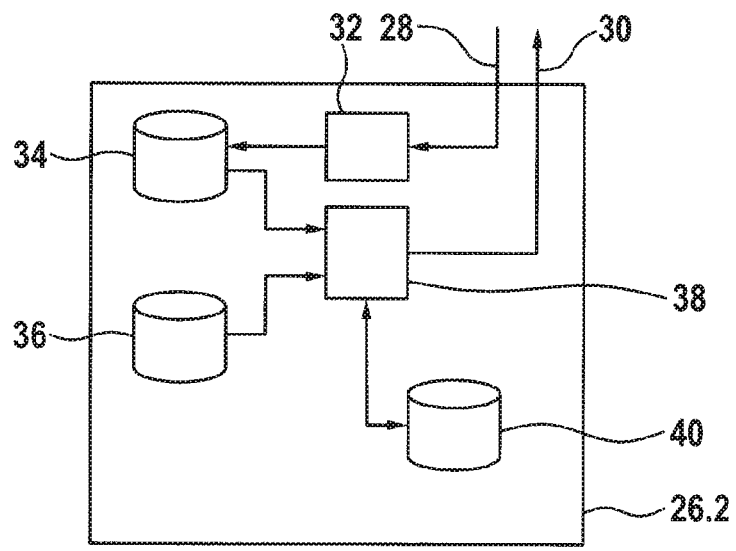
FIG. 3 shows a second embodiment of a device for generating test X-ray images.

FIG. 3 shows another embodiment of the generation device 26.2, which is essentially identical to the unit 26.1 shown in FIG. 2. Therefore, only the differences are addressed in the following discussion.

A test X-ray image database 40 in which test X-ray images generated by the image projection unit 38 are stored is also provided in the generation device 26.2. The image projection unit 38 is also configured for managing test X-ray images in the test X-ray image database 40 in such a way that test X-ray images which are older than a third time period and/or which have been used for a certain number of times, in particular once, are deleted or blocked for further use. This management measure may be provided alternatively or in addition to that described in conjunction with the update unit 32. It is also possible for the management measure, described here for the image projection unit 38, to be carried out by the update unit 32. For this purpose, it is necessary only to provide appropriate options for the update unit 32 to access the test X-ray image database 40.

The embodiment shown in FIG. 3 has the advantage over that in FIG. 2 that a large number of test X-ray images may be preproduced in the test X-ray image database 40 during operation. The test X-ray image database 40 is updated similarly as described for the embodiment in FIG. 2 for the inspection object database 34.

As a result, with all management measures no test X-ray images are used, in particular for the testing of operators, which could already be known to the operators.

The system described above proposes an approach for generating test X-ray images that have been generated in the manner of fictitious threat images (FTI) by using genuine X-ray images of inspection objects inspected on site. However, the test X-ray images are displayed in the manner of CTI X-ray images. Disadvantages in the FTI and CTI concepts may thus advantageously be avoided, and in particular the continuous operation of the inspection system 1 is not impaired. It is also ensured that the operators do not become accustomed to test X-ray images or are not able to remember them, since due to the above-described measures it is highly unlikely that an operator will encounter a test X-ray image multiple times. Since only X-ray images which originate from inspection objects and which have been inspected on site are used for generating test X-ray images, it is ensured that pieces of luggage and/or packages are used that are typical for the inspection site or are typical for the conditions currently prevailing at the inspection site, such as the time of year. It is essentially ensured that any possible special feature of inspection objects that are typical for the inspection site are also used in the test X-ray images. Thus, it is not possible for the test X-ray images to appear "suspicious" to an operator due to consciously or unconsciously perceivable deviations from X-ray images that are typical for the location.

Figure 4:
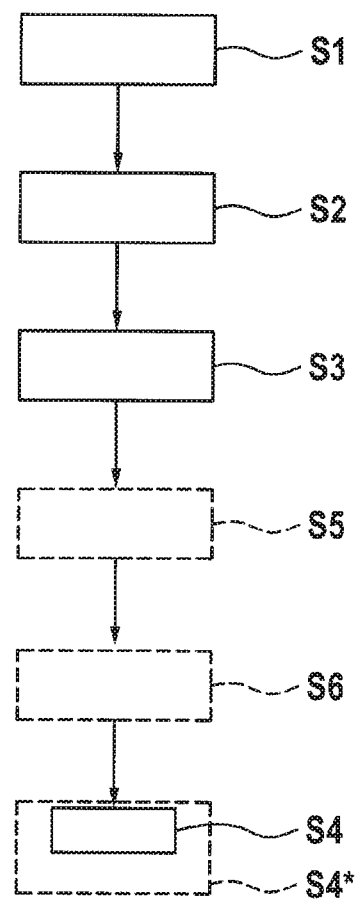
FIG. 4 shows a flow chart of a method for generating test X-ray images for training and/or testing operators of at least one X-ray inspection facility.

FIG. 4 shows a flow chart of a corresponding inspection method for inspection objects, in particular pieces of luggage or other packages, using at least one X-ray inspection facility 10.1, 10.2, 10.*n* for nondestructively inspecting inspection objects 14.

An X-ray image of an inspection object is provided and stored in step S1.

Image data of target items, such as hazardous objects or substances, are provided as target items and stored in step S2.

A test X-ray image is generated by projection of image data of a target item into one of the stored X-ray images of an inspection object in step S3.

A generated test X-ray image for training and/or testing is displayed to an operator in step S4, it being ensured that the test X-ray image is based on an X-ray image of an inspection object 14 that has been recorded/generated prior to a first time period and/or classified as safe during an automatic inspection. In other words, a test X-ray image is selected which has been generated prior to the set first time period and/or classified as safe during an automatic inspection.

In some embodiments of step S4, i.e., in a step S4*, it is further ensured that the test X-ray image is based on an X-ray image of an inspection object 14 which is not older than a second time period and/or which has not already been used for a certain number of times, in particular once, for generating a test X-ray image.

In some embodiments, between steps S3 and S4 or step S4* a step S5 is provided in which the generated test X-ray images are stored. The stored test X-ray images which are older than a third time period and/or which have already been used for a certain number of times, in particular once, are deleted or blocked for further use in a step S6.

It is noted that the second time period and the third time period may in principle have the same duration.

The invention claimed is:

1. A generation device for generating test X-ray images for nondestructively inspecting an inspection object, wherein the generation device comprises:
    an inspection object database for storing X-ray image data of inspection objects generated using at least one X-ray inspection facility;
    a target item database containing image data of target items;
    an image projector for projecting a virtual image of a target item from the target item database into an X-ray image from the inspection object database in order to generate a test X-ray image,
    wherein the image projector is configured for generating test X-ray images based on an X-ray image of an inspection object, the X-ray image having been recorded prior to a first time period, and the associated inspection object having already been classified as safe during an automatic inspection;
    a central controller communicatively coupled to the at least one X-ray inspection facility and connected to a display for displaying one or more test X-ray images for training or testing an operator, wherein the central controller is further configured to display false alarm images as test X-ray images; and
    an X-ray inspection algorithm for automatic inspection implemented in the at least one X-ray inspection facility, the X-ray inspection algorithm operable to determine a level of certainty that the target item is present in the inspection object, wherein in response to the level of certainty being below a threshold level of certainty, the operator determines whether the inspection object must be manually inspected.

2. The generation device according to claim 1, wherein the generation device further includes an updater for the inspection object database.

3. The generation device according to claim 2, wherein the updater is configured for updating the inspection object database by at least one of: deleting from the inspection object database or blocking further use of at least one of an X-ray image which is older than a second time period or an X-ray image which has been used for a certain number of times for generating a test X-ray image.

4. The generation device according to claim 3, wherein the certain number of times comprises once.

5. The generation device according to claim 1, wherein the image projector is configured for storing test X-ray images in a test X-ray image database.

6. The generation device according to claim 5, wherein the updater or the image projector is configured for updating test X-ray images in the test X-ray image database by at least one of deleting or blocking further use of at least one of a test X-ray image which is older than a third time period, or a test X-ray image which has been used for a certain number of times for training or testing an operator.

7. The generation device according to claim 6, wherein the certain number of times comprises once.

8. The generation device according to claim 1, wherein the associated inspection object has been classified as safe during an automatic inspection.

9. The generation device according to claim 1, wherein the inspection object comprises at least one of a piece of luggage or a package.

10. A method for generating test X-ray images for nondestructively inspecting an inspection object, wherein the method comprises:
providing X-ray images which have been generated using at least one X-ray inspection facility;
providing image data of target items;
generating a test X-ray image by projecting image data of a target item into one of the provided X-ray images;
displaying the test X-ray image for training and/or testing an operator, wherein the test X-ray image is based on an X-ray image of an inspection object, the X-ray image having been recorded prior to a first time period, and the associated inspection object having already been classified as safe during an automatic inspection;
based at least in part on the automatic inspection, determining a certainty level that the target item is present in the inspection object; and
based at least in part on the certainty level being below a threshold certainty level, displaying the inspection object with the target item to an operator for manual inspection.

11. The generation method according to claim 10, further comprising ensuring that the test X-ray image is based on at least one of an X-ray image of an inspection object which is not older than a second time period or an X-ray image of an inspection object which has not already been used for a certain number of times for generating a test X-ray image.

12. The method according to claim 11, wherein the certain number of times comprises once.

13. The generation method according to claim 10, further comprising storing the generated test X-ray images; and deleting or blocking for further use at least one of test X-ray images which are older than a second time period or test X-ray images which have already been used for a certain number of times.

14. The method according to claim 13, wherein the certain number of times comprises once.

15. The method according to claim 10, wherein the associated inspection object has been classified as safe during an automatic inspection.

16. The method according to claim 10, wherein the inspection object comprises at least one of a piece of luggage or a package.

17. A system for nondestructively inspecting an inspection object, wherein the system comprises:
generator for generating test X-ray images, the generator including:
an inspection object database for storing X-ray image data of inspection objects generated using at least one X-ray inspection facility;
a target item database containing image data of target items; and an image projector for projecting a virtual image of a target item from the target item database into an X-ray image from the inspection object database in order to generate a test X-ray image,
wherein the image projector is configured for generating test X-ray images based on an X-ray image of an inspection object, the X-ray image having been recorded prior to a first time period, and the associated inspection object having already been classified as safe during an automatic inspection; and
a central controller communicatively coupled to at least one of generator or the at least one X-ray inspection facility, wherein the central controller is further configured to display false alarm images as test X-ray images; and
an X-ray inspection algorithm for automatic inspection implemented in the at least one X-ray inspection facility, the X-ray inspection algorithm operable to determine a level of certainty that the target item is present in the inspection object, wherein in response to the level of certainty being below a threshold level of certainty, the operator determines whether the inspection object must be manually inspected.

18. The system according to claim 17, wherein the central controller comprises at least one display for at least one of displaying X-ray images of a current inspection object for visual inspection by an operator or displaying a test X-ray image.

19. The system according to claim 17, wherein the central controller is arranged with respect to the at least one X-ray inspection facility in such a way that an inspection object to be checked at that moment, using the at least one X-ray inspection facility, is not visible to an operator.

20. The system according to claim 17, wherein the inspection object comprises at least one of a piece of luggage or a package.

* * * * *